May 19, 1936.    L. F. CARTER    2,041,526
GYRO BASELINE
Filed April 22, 1929    3 Sheets-Sheet 1

INVENTOR
Leslie F. Carter.
BY
Herbert H. Thompson
his ATTORNEY.

May 19, 1936.  L. F. CARTER  2,041,526
GYRO BASELINE
Filed April 22, 1929   3 Sheets-Sheet 2
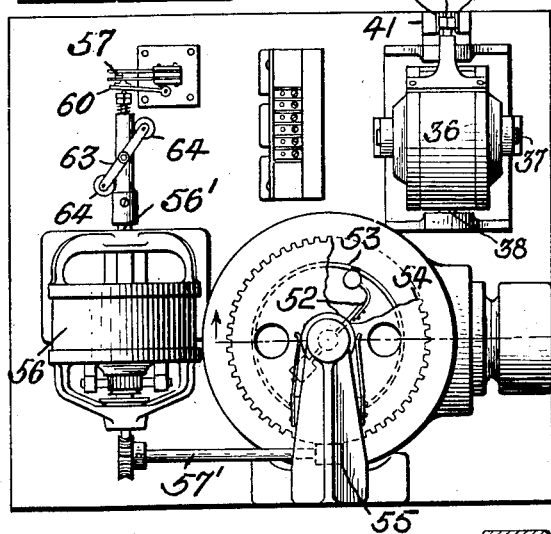
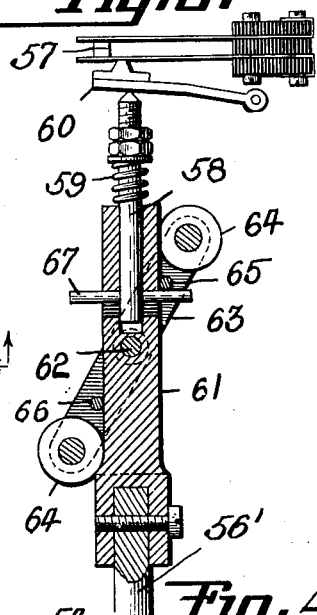
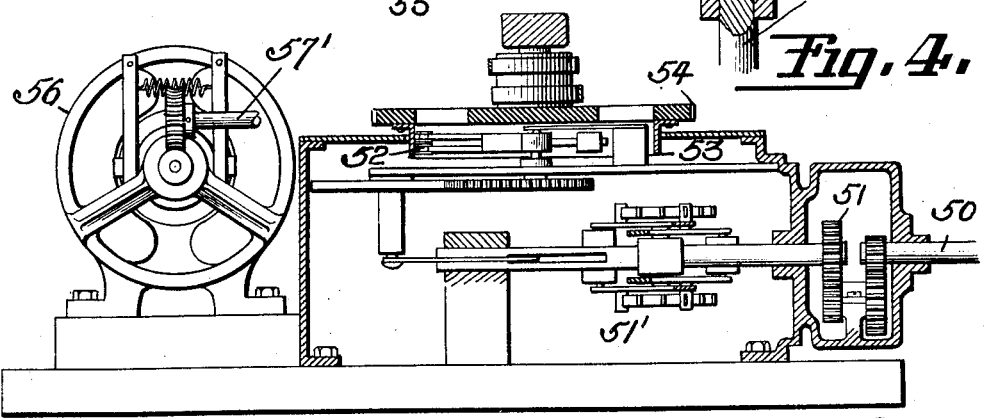
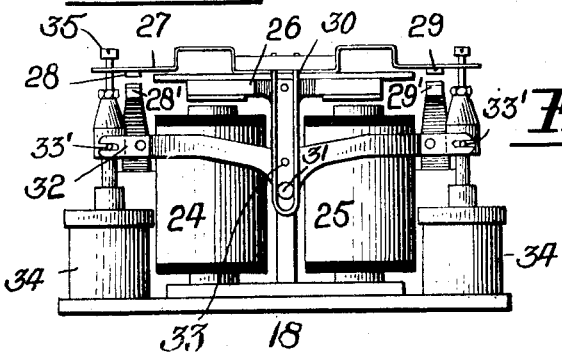
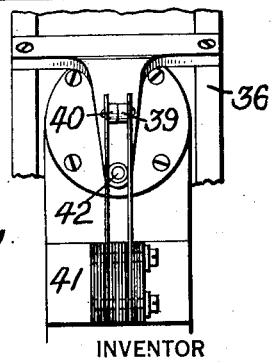
INVENTOR
Leslie F. Carter.
BY
Hubert F. Thompson
his ATTORNEY.

May 19, 1936.   L. F. CARTER   2,041,526
GYRO BASELINE
Filed April 22, 1929   3 Sheets-Sheet 3

INVENTOR
Leslie F. Carter.
BY
Herbert H. Thompson
his ATTORNEY.

Patented May 19, 1936

2,041,526

UNITED STATES PATENT OFFICE 2,041,526

GYRO BASELINE

Leslie F. Carter, Leonia, N. J., assignor, by mesne assignments, to Sperry Products, Inc., Brooklyn, N. Y., a corporation of New York Application April 22, 1929, Serial No. 358,418

13 Claims. (Cl. 33—204)

This invention relates to gyroscopes for maintaining a reference plane on a moving craft, such as a ship, train or aircraft, especially through the maintenance of a horizontal plane for detecting the tilt of the vehicle about either or both horizontal axes. My invention relates particularly to overcoming the disturbing effects of acceleration forces on the gyro system, whereby turning of the vehicle on which the device is mounted or change of speed of the same will not affect the baseline. My gyroscopic system comprises essentially a non-pendulous gyroscope having three degrees of freedom and which is controlled by torque-applying devices about one or both of its horizontal axes of support. Said torque-applying devices in turn are controlled from an auxiliary pendulum or pendulums and are adapted to be brought into action upon tilt of the vehicle in either plane with respect to the pendulum. The gyroscope having three degrees of freedom will tend to maintain its plane in space, but on account of the rotation of the earth, friction, and other causes will tend to wander from the vertical. With my torque-applying system, however, the gyro is maintained in the vertical without complicated compensating mechanisms. I have found, however, that such systems cause deviation of the gyroscope whenever the vehicle is accelerating in the broadest sense of the word, i. e., changing speed or turning, acceleration being any variation from a state of rest or uniform motion in a straight line. During such periods, therefore, I prefer to render inoperative such torque-applying mechanisms and for this purpose I provide a means for detecting the turning of the vehicle and change of speed of the vehicle for controlling the cut-out means.

Referring to the drawings in which the preferred form of the invention is shown, Fig. 1 is a side elevation, partly in section, of my gyro vertical.

Fig. 3 is a plan view, partly in section, of a speed-changing and turn-detecting means.

Fig. 4 is an end elevation, partly in section, of the speed-changing detecting means.

Fig. 5 is a detail of the switch-operating mechanism of the speed-change detecting means.

Fig. 6 is a side view of the delayed action relay employed between the contacts on the pendulum and the torque-applying devices.

Fig. 7 is a detailed end elevation of a portion of the turn-indicating gyroscope.

Figure 1:
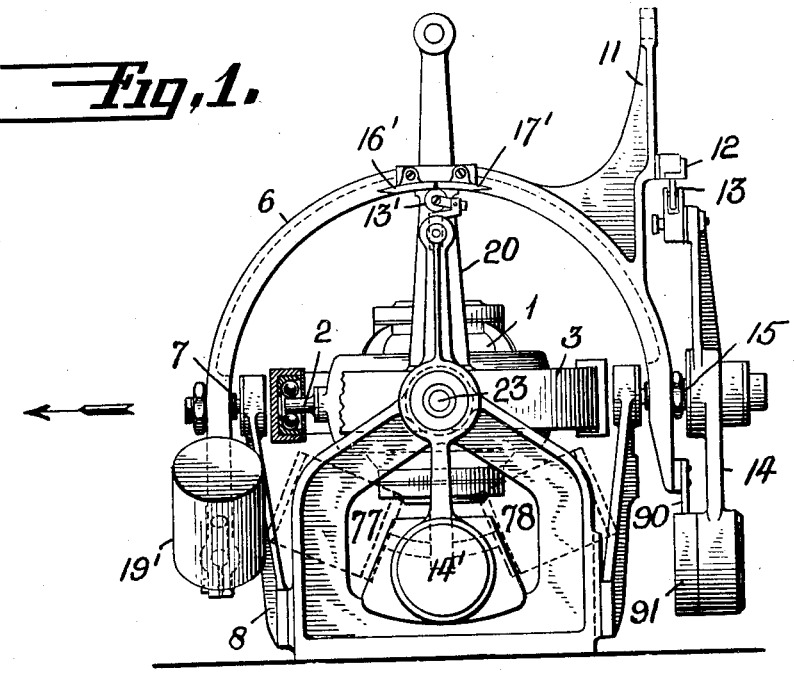
Figure 2:
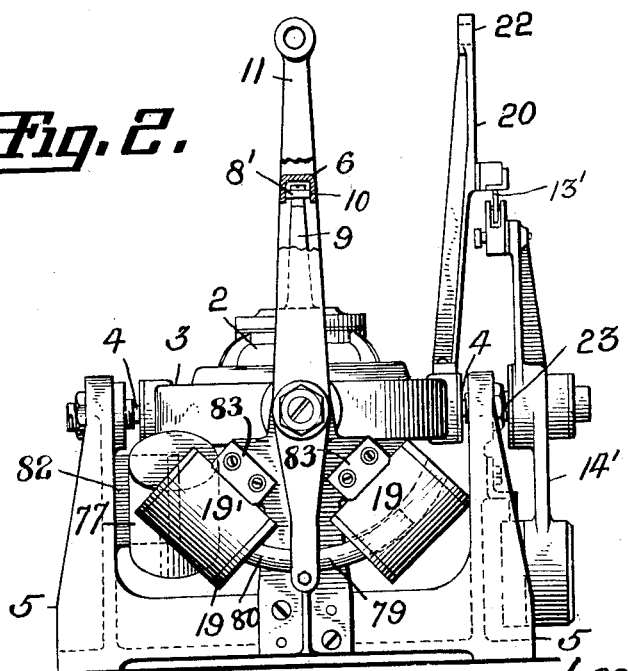
Fig. 2 is a front elevation of the same.
Figure 9:
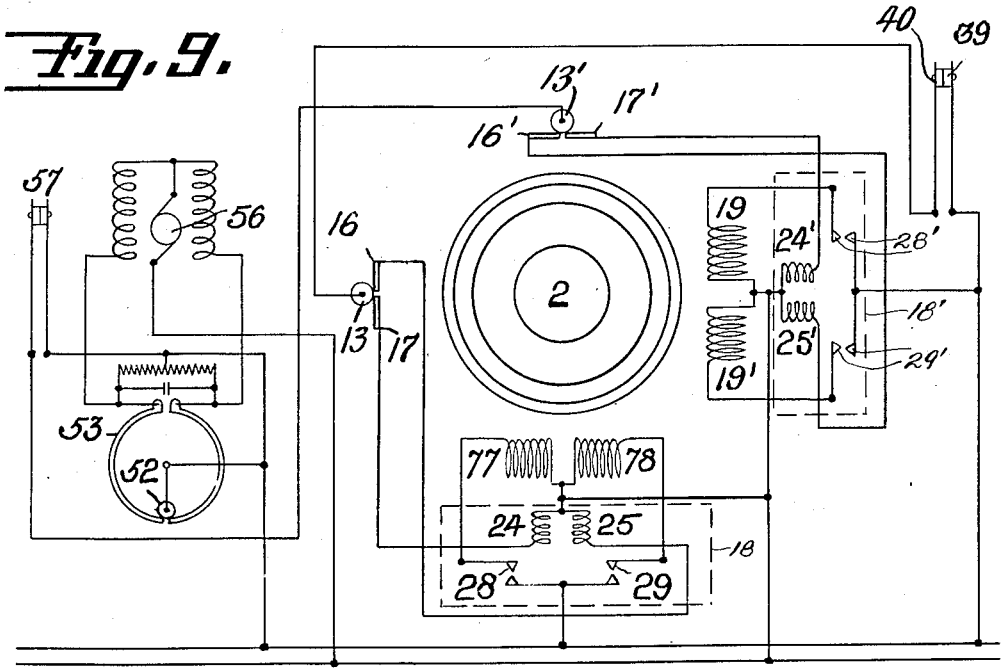
Fig. 9 is a wiring diagram showing the connections between the controllers and the torque means.

In the embodiment shown, the gyroscope comprises the casing 1 within which is journaled a rotor (not shown) for spinning about a vertical axis. The casing is pivoted in the usual manner for oscillation about both horizontal axes in line with and at right angles to the direction of travel of the vehicle. In Fig. 1 the vehicle is represented as travelling in the direction of the arrow, the inner gimbal axis 2 of the gyro being parallel thereto, the gimbal ring 3 being in turn journaled on the transverse axis 4—4 in the supporting brackets 5—5 (Fig. 2). A loop or bail 6 is shown as journaled on the horizontal axis 7 in line with axis 2 in fixed brackets 8, said loop being connected to the gyro by means of rollers 8' on stem 9 rising from the gyro which takes in the U-shaped trackway 10 of the loop. An arm 11 is shown as rising from said loop to which is attached any suitable indicator or recording means for indicating the tilt of the vehicle transverse to the line of travel of the same. Thus, a recording pen attached to the arm 11 on a railway car would act as a cross leveling indicator, recording whether or not the two rails were at the same level, and if employed on a ship would record the roll thereof. Said arm is also shown as carrying a contact sector 12 with which the trolley 13 on the pendulum 14 contacts. Said pendulum is shown as pivoted on an axis 15 in line with the aforesaid axes 2 and 7, the trolley normally bearing on the dead section between the contacts, so that when the car tilts laterally, the trolley will roll on one or the other of the live contacts 16 and 17 (Fig. 9) and complete a circuit through the relay 18 (Fig. 6) and thence to the torque-applying device 77, 78 adapted to apply torque about the transverse axis of the gyro at right angles to the axis of the pendulum 14. Said pendulum is heavily damped by vane 90 which takes in an oil pot 91 secured to the pendulum.

I also provide a similar arm 20 rising from the gimbal ring 3 which may carry an indicator or recording pen (not shown), which may be connected to the arm at point 22 and which will record or show the grade of the track, if employed on a railway car, or the pitch of a ship if employed on a vessel or airplane. Said arm is also shown as carrying the contacts 16'—17' similar to contacts 16 and 17 above referred to, which cooperate with a trolley 13' on the pendulum 14' pivoted on an axis 23 in line with axis 4—4 of the gyroscope. Said contacts are in circuit with the torque-applying device 19, 19' acting about the longitudinal axis of the gyroscope.

As indicated above, however, I place delayed-action relays or other delayed-action device between the aforesaid contacts and the torque-applying devices in order to prevent the closing of the solenoid circuits by the short period disturbances of the pendulums. Each of the two relays may take the form shown in Fig. 6 and comprise the electro-magnets 24 and 25 in circuit respectively with contacts 16 and 17. Pivoted on the frame of said magnets is armature 26. Flexibly secured to said armature adjacent the gimbal point is a spring contact strip 27, having at each end contacts 28—29. Also secured to said armature is a spring wire loop 30 which takes around a pin 31 secured to the lever 32 pivoted at 33. Said lever is pinned adjacent each end to piston 33' of a one-way dash-pot cylinder 34, which is adapted for slow downward movement. When, therefore, the armature 26 is first tilted by the excitation of one or the other of magnets 24—25, contact is not completed between contact 28, for instance, and lower contact 28', but the continued pressure through the spring loop 30 on the pin 31 gradually tilts the lever 32 against the action of the dash-pot 34 and finally brings the stop 35 on the piston 33' into contact with the free end of the spring 27, finally pushing the spring down to close the contact 28—28'. By such means, brief disturbances of the pendulum will not disturb the gyroscope. The relay contacts 28, 29 in turn are connected to the torque applying means 77, 78 hereinafter described. It will be understood that such a relay 18', comprising electromagnets 24', 25' controlling contacts 28', 29', is also placed between the contacts 16' and 17' and the torque applying means 19, 19' about the other axis of the gyroscope.

For detecting turning of the vehicle, I have shown a small "turn indicator" gyroscope 36 with two degrees of freedom. Preferably the spinning axis 37 of the gyroscope is normally horizontal and placed laterally on the car, the gyro pivots 38 being placed longitudinally on the car, the gyro precessing around horizontal axis 38 when the car enters a curve. Preferably the direction of rotation of the gyroscope is such that direction of precession is opposite to the direction of car tilt so that both factors work together to open the contacts actuated thereby. Said contacts are shown in the form of spring contact arms 39, 40 (Fig. 7) fixed on the base 41 of the gyroscope and against which a pin 42 fixed to the gyro case is adapted to strike or press as the gyro precesses.

For detecting change of speed of the vehicle, I may employ a device actuated from any part of the vehicle which is rotated by the forward movement thereof, for instance, in the case of a car the shaft 50 (Figs. 3 and 4) may be actuated from the car axle. Said shaft is shown as connected to any standard form of speedometer 51' through suitable reduction gearing 51. Such devices are known articles of commerce and need not be described in detail. In place of the usual indicating hand on such speedometer, I mount a contact arm 52 adapted to contact with the split ring 53. Said ring is also rotatably mounted on the top of the speedometer and is shown as provided with gear teeth 54 with which meshes a worm 55. Said worm is driven from a small motor 56 through the worm shaft 57', the motor being in circuit with the aforesaid contacts and split ring so that the split ring will be maintained with its insulated section underneath the trolley.

The motor, therefore, only runs when there is a change of speed. I, therefore, make use of this fact to break a contact when the motor is running which throws out of operation the torque-applying devices. For this purpose I have shown spring-pressed contacts 57 normally in circuit with said devices, the leaf springs being normally biased to maintain the contacts open. The contacts are normally maintained closed, however, by the pin 58 pressed forwardly by the compression spring 59 so as to bear against the arm 60 which in turn holds the contacts closed. Said pin is shown as mounted in a stem or sleeve 61 secured to the end of the motor shaft 56'. On said stem is swiveled at 62 spaced arms 63 between which are journaled at their outer ends centrifugal masses 64. Between said arms are also placed cross or stop pins 65—66. The former is shown as bearing against cross pin 67 in the stem 58. It will readily be seen that when the motor shaft revolves, the centrifugal action on the masses 64 will cause the arm 63 to rotate clockwise in Fig. 5 and press downwardly on the cross pin 67 to permit opening of the contact.

Figure 8:
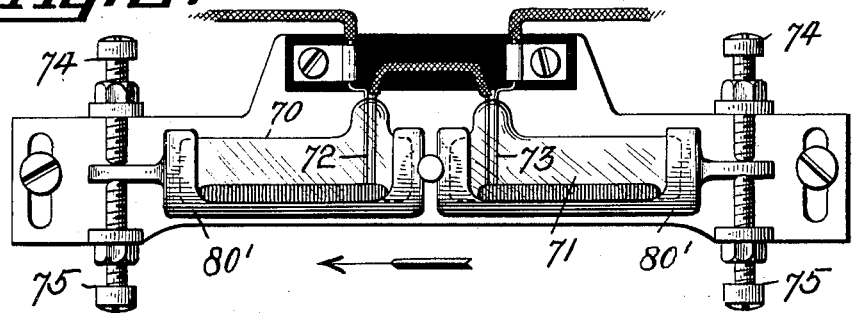
Fig. 8 is a side view of another form of acceleration detecting means.

In place of a speed-detecting means of this character, I may employ mercury tubes, such as shown in Fig. 8. In this form a pair of sealed tubes 70 and 71 are employed, each containing a small amount of mercury. Sealed within each of said tubes at different ends are a pair of electric contacts 72—73. Normally the mercury contacts with both elements of each pair so that the circuit is closed. Upon an increase in speed of the car in the direction of the arrow, for instance, the mercury will flow in the opposite direction breaking contact between the elements of contacts 73, while if deceleration takes place, contact will be broken between elements 72. Both contacts may be placed in series as the purpose is to deenergize the torque-applying devices upon either increase or decrease in velocity. The outer ends of the tube support 80' are shown as adjustably supported between clamp screws 74 and 75 so that their levels may be accurately set.

The torque-applying devices themselves are shown as consisting of two pairs of solenoids 77, 78 and 19, 19' secured to the fixed base of the gyroscope, the solenoids 19, 19' acting on the gyroscope through a pair of arc-shaped cores 79, 80, which extend part way within said solenoids. Upon excitation of either solenoid it will readily be seen that a powerful torque is exerted on the gyroscope. Solenoids 77, 78 act through similar cores about the other axis. Solenoids 77, 78 are shown mounted on fixed base 5 by brackets 82 (see Fig. 2), while solenoids 19, 19' are shown mounted on fixed brackets 8 by brackets 83.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. Means for maintaining a fixed reference plane on a moving craft comprising a non-pendulous gyro having a normally vertical spin axis, a mounting for said gyro providing three degrees of freedom, pendulous means for detecting deviations of said gyro axis from the vertical, means controlled by said pendulous means for opposing said deviations and restoring said axis to the vertical, means for rendering said pendulous means ineffective to control said restoring means, and means whereby said means for rendering said pendulous means ineffective is controlled by change of speed or course of the craft.

2. Means for maintaining a fixed reference plane on a moving craft comprising a non-pendulous gyro, having a normally vertical spin axis, a mounting for said gyro providing three degrees of freedom, pendulous means for detecting deviations of said gyro axis from the vertical, means controlled by said pendulous means for applying a torque about an axis at right angles to the axis of deviation for opposing said deviation and restoring said axis to the vertical, means for rendering said pendulous means ineffective to control said restoring means, and means whereby said means for rendering said pendulous means ineffective is controlled by change of speed or course of the craft.

3. Means for maintaining a fixed reference plane on a moving craft comprising a non-pendulous gyro having a normally vertical spin axis, a mounting for said gyro providing freedom of oscillation about the fore and aft and transverse axes of the craft, a plurality of damped pendulums for detecting deviations of said gyro axis from the vertical about each of said axes, means controlled by said pendulums for opposing said deviations and restoring said axis to the vertical, said last-named means comprising a plurality of pairs of torque-applying devices, one pair for each of said pendulums, and means whereby the one of said devices controlled by the transversely pivoted pendulum is rendered ineffective by the change of speed of the craft.

4. Means for maintaining a fixed reference plane on a moving craft comprising a non-pendulous gyro having a normally vertical spin axis, a mounting for said gyro providing freedom of oscillation about the fore and aft and transverse axes of the craft, a plurality of damped pendulums for detecting deviations of said gyro axis from the vertical about each of said axes, means controlled by said pendulums for opposing said deviations and restoring said axis to the vertical, said last-named means comprising a plurality of pairs of torque-applying devices, one pair for each of said pendulums, means whereby the one of said devices controlled by the transversely pivoted pendulum is rendered ineffective by the change of speed of the craft, and means whereby the other of said devices is rendered inoperative by turning of the craft.

5. Means for maintaining a fixed reference plane on a moving craft comprising a non-pendulous gyro having a normally vertical spin axis, a mounting for said gyro providing freedom of oscillation about the fore and aft and transverse axes of the craft, a plurality of damped pendulum for detecting deviations of said gyro axis from the vertical about each of said axes, means controlled by said pendulum for opposing said deviations and restoring said axis to the vertical, said last-named means comprising a plurality of pairs of torque-applying devices, one pair for each of said pendulums, and means whereby the one of said devices controlled by the longitudinally pivoted pendulum is rendered ineffective by the turning of the craft.

6. Means for maintaining a fixed reference plane on a moving craft comprising a non-pendulous gyro having a normally vertical spin axis, a mounting for said gyro providing three degrees of freedom, a plurality of pendulous means for detecting deviations of said gyro axis from the vertical, means controlled by said pendulous means for opposing said deviations and restoring said axis to the vertical, said last-named means comprising a plurality of pairs of solenoids, one pair for each of said pendulous means, and means whereby one of a pair of said solenoids is rendered effective to apply a torque by the respective pendulous means upon deviation of said gyro axis.

7. Means for maintaining a fixed reference plane on a moving craft comprising a non-pendulous gyro having a normally vertical spin axis, a mounting for said gyro providing three degrees of freedom, a plurality of pendulous means for detecting deviations of said gyro axis from the vertical, means controlled by said pendulous means for opposing said deviations and restoring said axis to the vertical, and means whereby one of said pendulous means is rendered ineffective to control said restoring means during turning of the craft, said last-named means including an electric circuit, a gyro mounted with two degrees of freedom to respond to turning of the craft, and means whereby said gyro breaks said circuit upon turning of the craft.

8. Means for maintaining a fixed reference plane on a moving craft comprising a non-pendulous gyro having a normally vertical spin axis, a mounting for said gyro providing three degrees of freedom, a plurality of pendulous means for detecting deviations of said gyro axis from the vertical, means controlled by said pendulous means for opposing said deviations and restoring said axis to the vertical, and means whereby one of said pendulous means is rendered ineffective to control said restoring means during change of speed of the craft including means brought into action by change of speed of the craft, and means controlled thereby for temporarily rendering said restoring means inoperative.

9. In a gyro base-line for moving vehicles, the combination with a gyroscope having three degrees of freedom, of means for supporting the same, a pendulous device mounted independently movable with respect to said gyroscope so as not to affect the equilibrium of the gyroscope or to be affected by the movements of said gyroscope, a source of power controlled thereby, and means whereby the power from said source is directly applied to said gyroscope as a controlling torque.

10. In a gyro base-line for moving vehicles, the combination with a gyroscope having three degrees of freedom, of means for supporting the same, a pendulous device mounted independently movable with respect to said gyroscope so as not to affect the equilibrium of the gyroscope or to be affected by the movements of said gyroscope, a source of power controlled thereby for applying a controlling torque on the gyroscope, and means for rendering ineffective the control of said source of power from said device during acceleration of the vehicle.

11. In a gyro base-line for moving vehicles, the combination with a gyroscope, of means for supporting the same upon a plurality of axes so as to have three degrees of freedom in connection with its spinning axis, a plurality of pendulous devices operating about said supporting axes and mounted independently movable with respect to said gyroscope so as not to affect the equilibrium of the gyroscope or to be affected by the movements of said gyroscope, a plurality of sources of power controlled by the respective pendulous devices, and means whereby power from said sources is applied directly to the gyroscope as controlling torques about said axes of support.

12. In a gyro base-line, the combination with a neutral gyroscope, of means for supporting the same, means for applying controlling torques on said gyroscope, including means mounted to be independently movable relative to said gyroscope so as not to affect the equilibrium of said gyroscope or to be affected by the movements of said gyroscope, and automatic means for rendering said torque-applying means inoperative during acceleration of the craft.

13. In a gyro-baseline, the combination with a neutral gyroscope, of means for supporting the same, means for applying controlling torques on said gyroscope, including means mounted to be independently movable relative to said gyroscope so as not to affect the equilibrium of said gyroscope or to be affected by the movements of said gyroscope, said torque-applying means including an electric circuit, and automatic means for rendering said torque-applying means inoperative during acceleration of the craft, including a change-of-speed-responsive mechanism and means brought into action by movement of said mechanism for controlling said circuit to render said torque-applying means inoperative.

LESLIE F. CARTER.